(12) United States Patent
Liu

(10) Patent No.: US 11,071,328 B2
(45) Date of Patent: Jul. 27, 2021

(54) ELECTRONIC CIGARETTE

(71) Applicant: Tuanfang Liu, Shenzhen (CN)

(72) Inventor: Tuanfang Liu, Shenzhen (CN)

( * ) Notice: Subject to any disclaimer, the term of this patent is extended or adjusted under 35 U.S.C. 154(b) by 279 days.

(21) Appl. No.: 16/395,202

(22) Filed: Apr. 25, 2019

(65) Prior Publication Data

US 2020/0187567 A1  Jun. 18, 2020

(30) Foreign Application Priority Data

Dec. 18, 2018 (CN) .......................... 201811550182.4
Dec. 18, 2018 (CN) .......................... 201822132438.1

(51) Int. Cl.
| | |
|---|---|
| *A24F 13/00* | (2006.01) |
| *A24F 47/00* | (2020.01) |
| *A24F 7/02* | (2006.01) |
| *F16J 15/02* | (2006.01) |

(52) U.S. Cl.
CPC .............. *A24F 47/008* (2013.01); *A24F 7/02* (2013.01); *F16J 15/022* (2013.01)

(58) Field of Classification Search
CPC ....................................................... A24F 47/00
USPC .................................................. 131/328–329
See application file for complete search history.

(56) References Cited

U.S. PATENT DOCUMENTS

| | | | |
|---|---|---|---|
| 9,961,942 B2 * | 5/2018 | Liu .......................... | A24F 40/40 |
| 10,188,147 B2 * | 1/2019 | Liu ........................ | A24F 40/485 |
| 10,582,728 B2 * | 3/2020 | Liu .......................... | A24F 40/40 |

* cited by examiner

*Primary Examiner* — Phuong K Dinh
(74) *Attorney, Agent, or Firm* — Matthias Scholl P.C.; Matthias Scholl

(57) ABSTRACT

An electronic cigarette, including a mouthpiece assembly, an atomization assembly, and a base assembly. The mouthpiece assembly includes a mouthpiece, a decorative cover, a movable cover, a fixed base adapted to fix the mouthpiece, a seal ring adapted to seal the fixed base, a first seal ring and a second seal ring adapted to seal the mouthpiece, and a sliding block. The atomization assembly includes a positioning pin, a limit spring, an upper holder, a gasket, a third seal ring adapted to seal the upper holder, a glass tube, an upper seal ring adapted to seal the glass tube, a lower seal ring adapted to seal the glass tube, a fourth seal ring adapted to seal the lower holder, a lower holder, a connecting thread, a spring, a first cylinder, a fifth seal ring adapted to seal the first cylinder, a second cylinder, and an atomizing core.

1 Claim, 6 Drawing Sheets

US 11,071,328 B2

ELECTRONIC CIGARETTE

CROSS-REFERENCE TO RELAYED APPLICATIONS

Pursuant to 35 U.S.C. § 119 and the Paris Convention Treaty, this application claims foreign priority to Chinese Patent Application No. 201811550182.4 filed Dec. 18, 2018, and to Chinese Patent Application No. 201822132438.1 filed Dec. 18, 2018. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

This disclosure relates to an electronic cigarette.

Electronic cigarettes atomize nicotine-containing e-liquid. E-liquid needs to be refilled when it is consumed. The refilling process is cumbersome and the e-liquid tends to spill during refilling.

SUMMARY

Provided is an electronic cigarette, comprising a mouthpiece assembly, an atomization assembly, and a base assembly.

The mouthpiece assembly comprises a mouthpiece, a decorative cover, a movable cover, a fixed base adapted to fix the mouthpiece, a seal ring adapted to seal the fixed base, a first seal ring and a second seal ring adapted to seal the mouthpiece, and a sliding block.

The atomization assembly comprises a positioning pin, a limit spring, an upper holder, a gasket, a third seal ring adapted to seal the upper holder, a glass tube, an upper seal ring adapted to seal the glass tube, a lower seal ring adapted to seal the glass tube, a fourth seal ring adapted to seal the lower holder, a lower holder, a connecting thread, a spring, a first cylinder, a fifth seal ring adapted to seal the first cylinder, a second cylinder, and an atomizing core.

The base assembly comprises an airflow regulating ring, a fixing ring adapted to fix the airflow regulating ring, a sixth seal ring adapted to seal the fixing ring, a joint, an insulating ring, a base, and a seventh seal ring adapted to seal the base.

The seal ring is sheathed on the fixed base and the fixed base is disposed in the movable cover; the decorative cover is disposed in the movable cover and fixed on the fixed base; the first seal ring and the second seal ring are sheathed on the mouthpiece; the mouthpiece is in threaded connection to the decorative cover; the sliding block is embedded in the fixed base and fixed in the movable cover.

The gasket is attached to the upper holder; the third seal ring and the upper seal ring are respectively embedded in an inner ring and an outer groove of the upper holder; the second cylinder is sheathed on the connecting thread; the spring is disposed in the second cylinder; the fifth seal ring is disposed in the first cylinder; the first cylinder and the atomizing core are embedded in the lower holder; the lower seal ring is embedded in a groove of the lower holder; the fourth seal ring is sheathed on the lower seal ring; the glass tube is fixed on the lower holder; the lower holder is in threaded connection to the upper holder; the limit spring is sheathed on the positioning pin, and the positioning pin is fixed on the upper holder.

The connecting thread, the spring, the first cylinder, the fifth seal ring and the second cylinder constitute an elastic e-liquid sealer. When the atomizing core is mounted on the lower holder and is pressed downward, the first cylinder also moves downwards, the spring deforms, and the e-liquid inlet of the lower holder is opened, the e-liquid enters the atomizing core. When the atomizing core is pulled out, the spring resets, the first cylinder returns to the original position, the e-liquid inlet is closed and separated from the atomizing core, thus avoiding the leakage of the e-liquid in the process of replacing the atomizing core.

The mouthpiece assembly is disposed on the atomization assembly. The sliding block is embedded in the upper holder via the positioning pin. In use, the movable cover is pulled up and pushed to one side, and the sliding block shifts to a fixed direction, so that the e-liquid inlet on the gasket under the movable cover is exposed for e-liquid charging.

The joint is disposed in the insulating ring; the insulating ring is disposed in the base; the sixth seal ring is sheathed on the fixing ring, and the fixing ring is sheathed on the base; the seventh seal ring is sheathed on the base; and the airflow regulating ring is in threaded connection to the base.

The base is in threaded connection to the lower holder of the atomization assembly.

DETAILED DESCRIPTION

To further illustrate, embodiments detailing an electronic cigarette are described below. It should be noted that the following embodiments are intended to describe and not to limit the disclosure.

Figure 1:
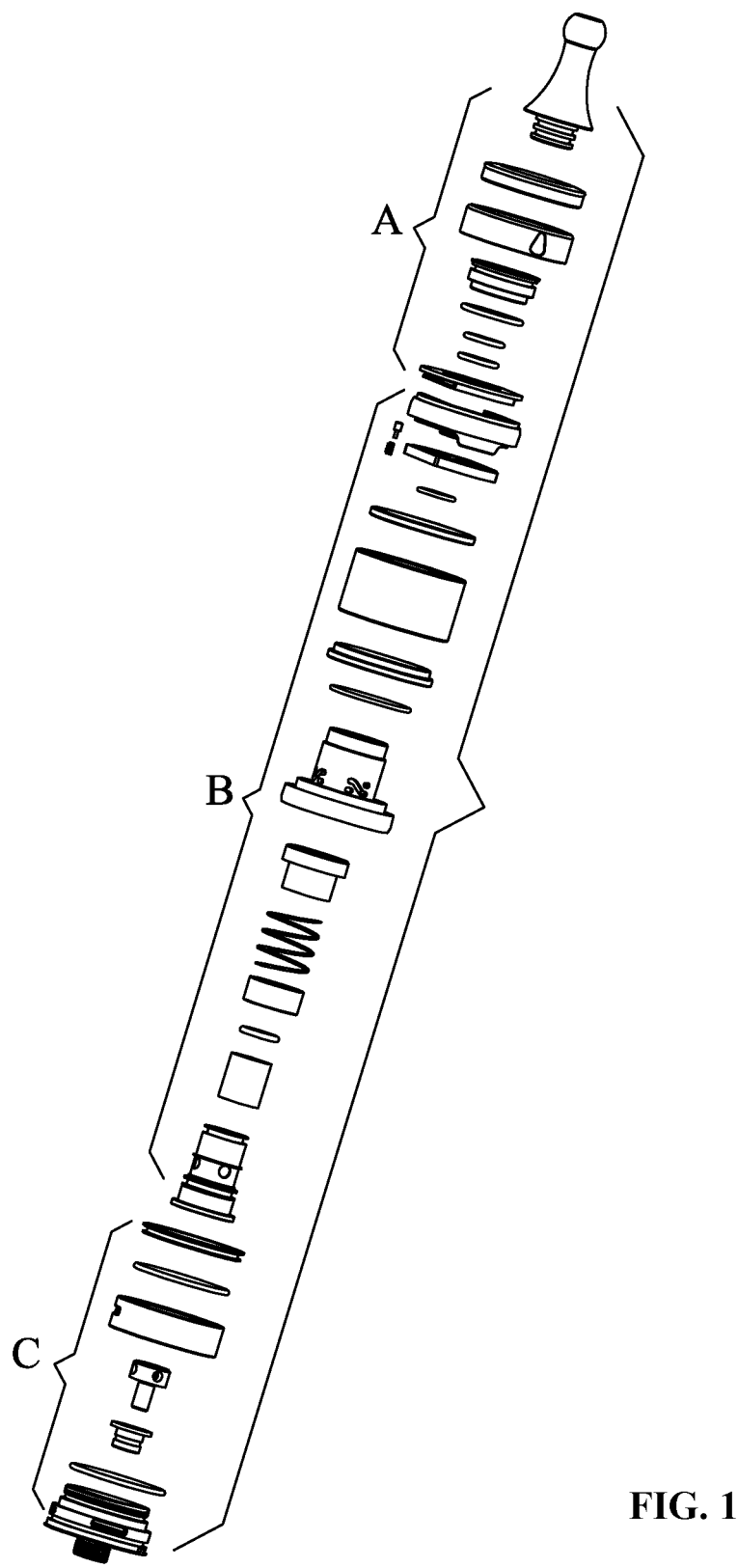
FIG. 1 is an exploded view of an electronic cigarette as described in the disclosure.
Figure 2:
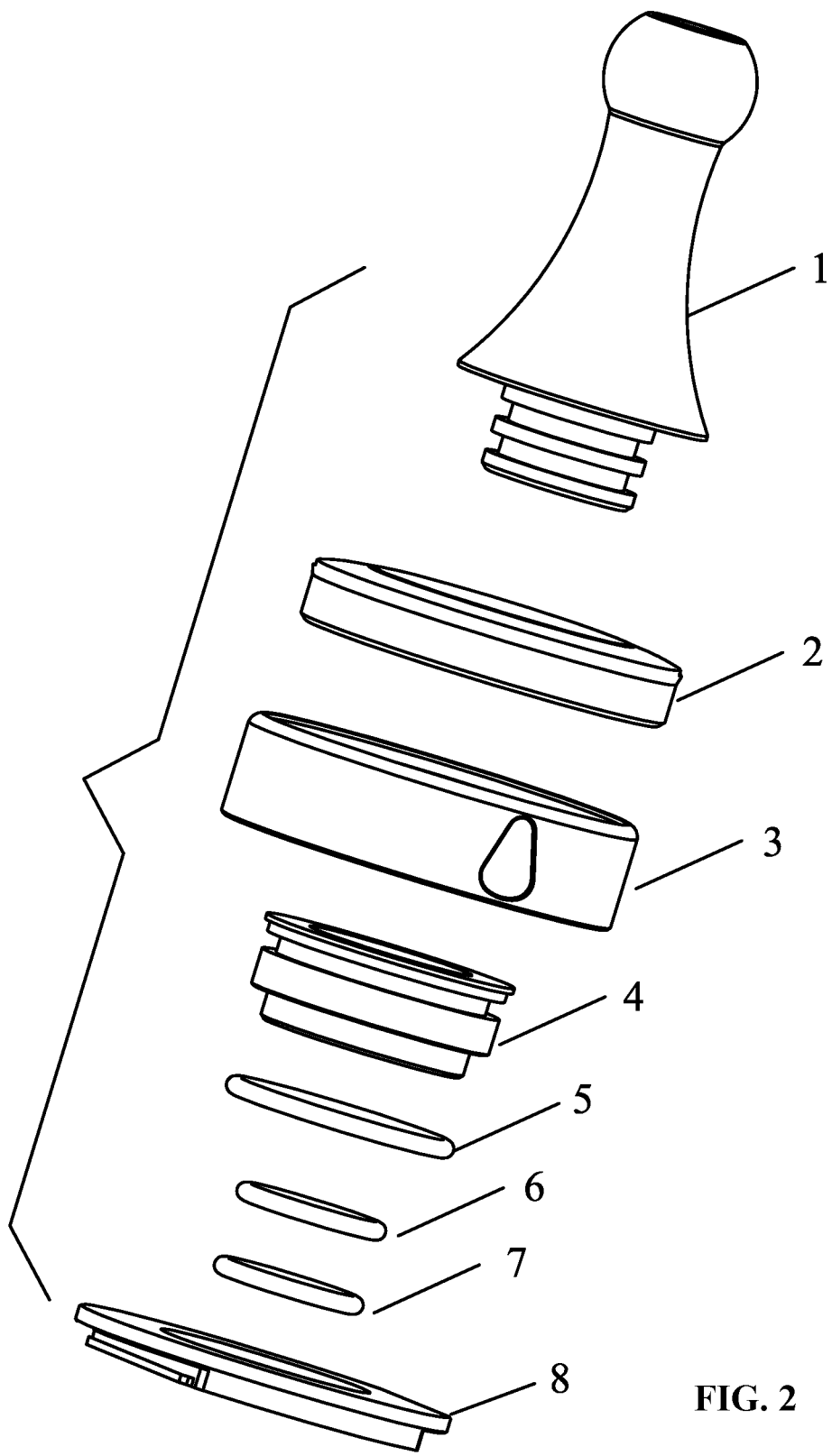
FIG. 2 is an exploded view of a mouthpiece assembly of an electronic cigarette as described in the disclosure.
Figure 3:
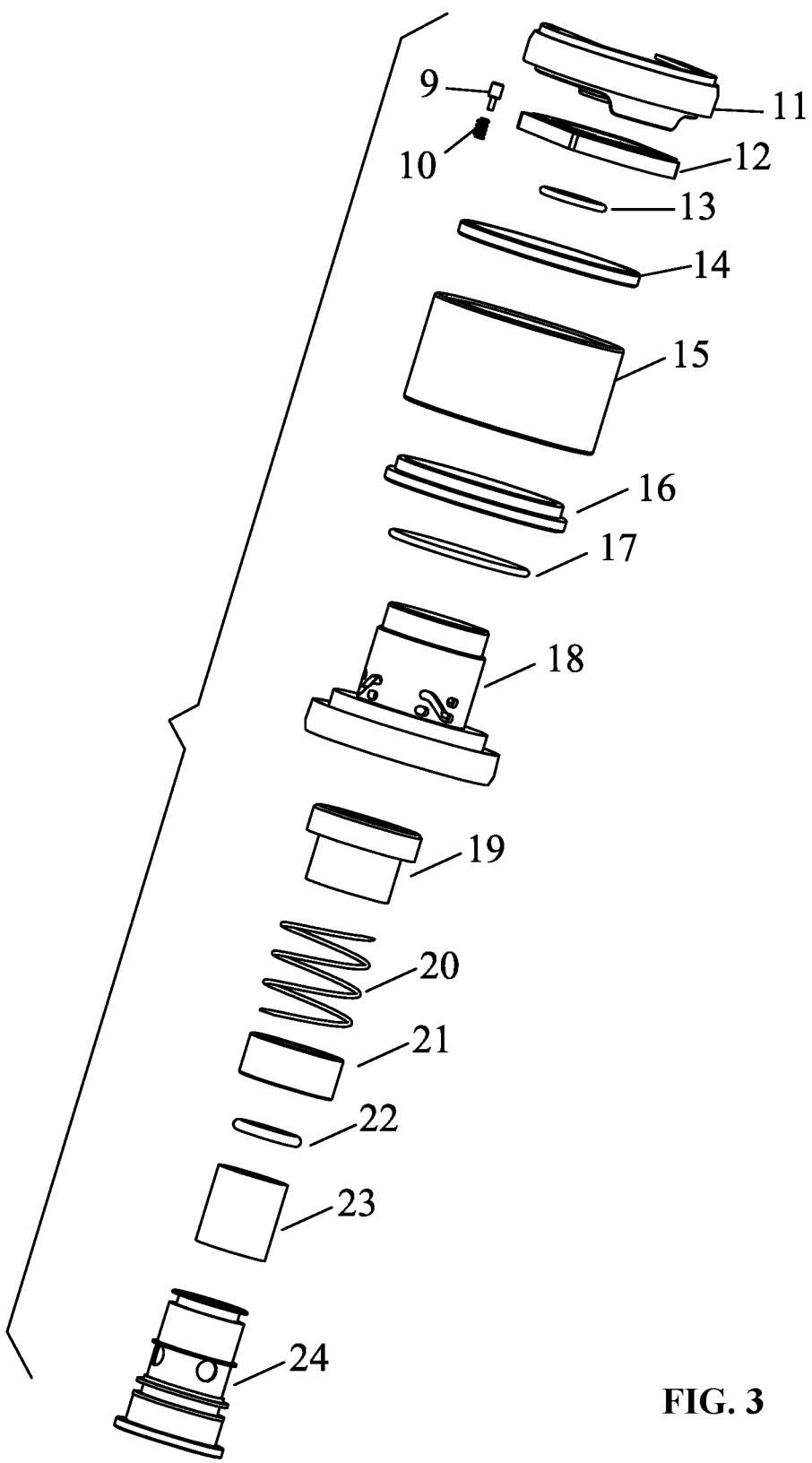
FIG. 3 is an exploded view of an atomization assembly of an electronic cigarette as described in the disclosure.
Figure 4:
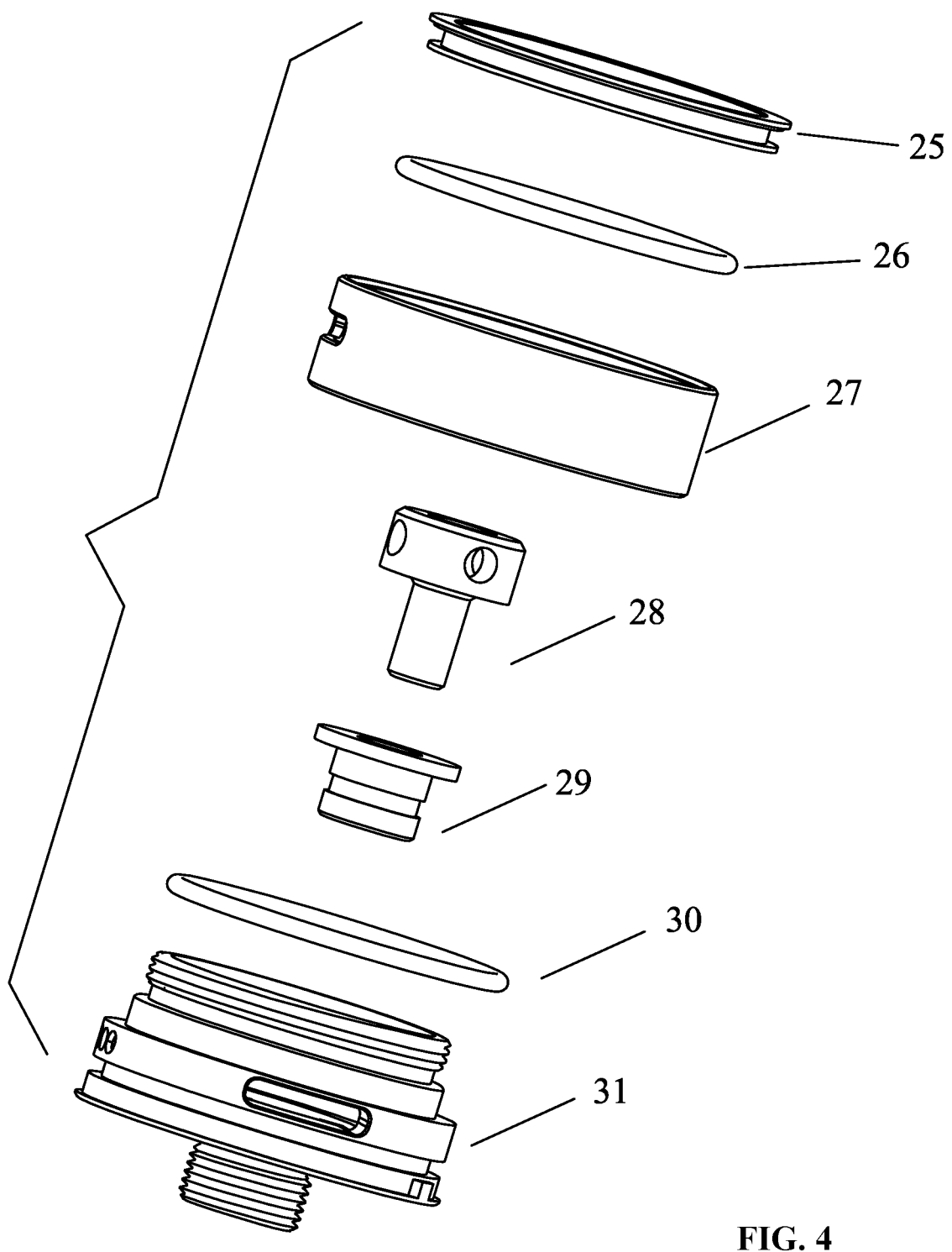
FIG. 4 is an exploded view of a base assembly of an electronic cigarette as described in the disclosure.
Figure 5:
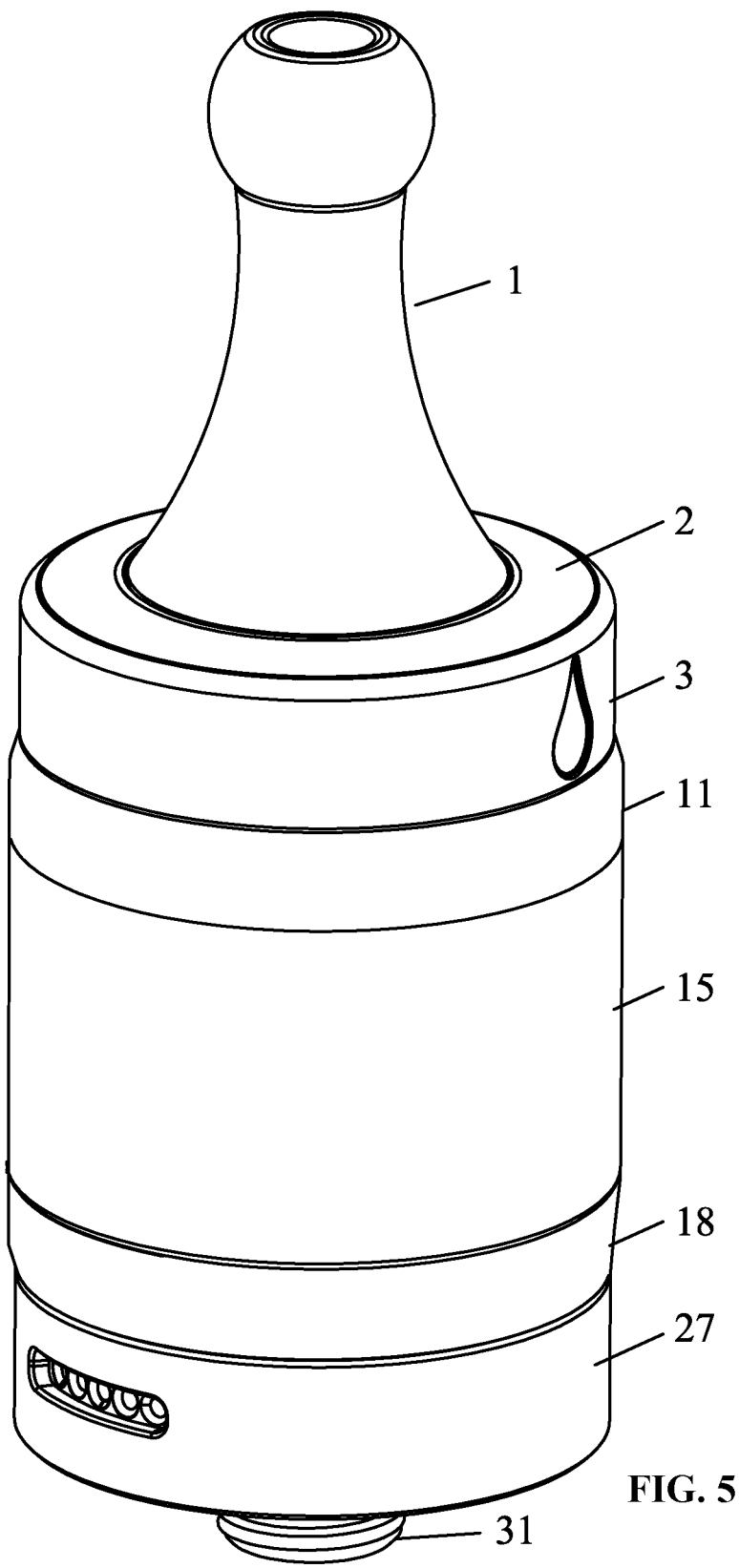
FIG. 5 is a stereogram of an electronic cigarette as described in the disclosure.
Figure 6:
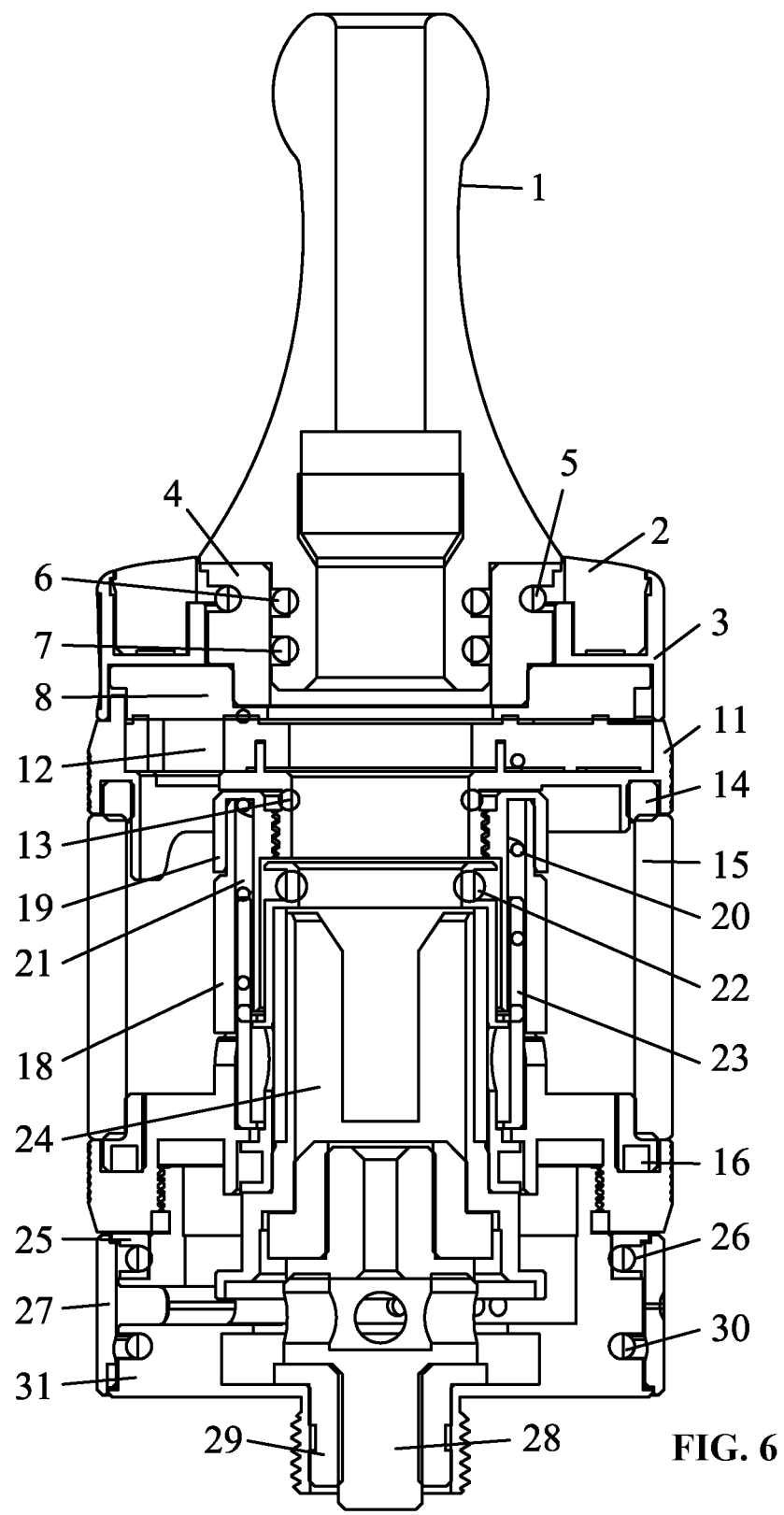
FIG. 6 is a sectional view of an electronic cigarette as described in the disclosure.

As shown in FIGS. 1-6, provided is an electronic cigarette, comprising: a mouthpiece assembly A; an atomization assembly B, and a base assembly C. The mouthpiece assembly A is disposed on the atomization assembly B. The atomization core is disposed in the atomization assembly. The base assembly is connected to the atomization assembly.

The mouthpiece assembly A comprises a mouthpiece 1, a decorative cover 2, a movable cover 3, a fixed base 4 adapted to fix the mouthpiece, a seal ring 5 adapted to seal the fixed base, a first seal ring 6 and a second seal ring 7 adapted to seal the mouthpiece, and a sliding block 8. The seal ring 5 is sheathed on the fixed base 4 and the fixed base 4 is disposed in the movable cover 3; the decorative cover 2 is disposed in the movable cover 3 and fixed on the fixed base 4; the first seal ring 6 and the second seal ring 7 are sheathed on the mouthpiece 1; the mouthpiece 1 is in threaded connection to the decorative cover 2; the sliding block 8 is embedded in the fixed base 4 and fixed in the movable cover 3.

The atomization assembly B comprises a positioning pin 9, a limit spring 10, an upper holder 11, a gasket 12, a third seal ring 13 adapted to seal the upper holder, a glass tube 15, an upper seal ring 14 adapted to seal the glass tube, a lower seal ring 16 adapted to seal the glass tube, a fourth seal ring 17 adapted to seal the lower holder, a lower holder 18, a connecting thread 19, a spring 20, a first cylinder 21, a fifth seal ring 22 adapted to seal the first cylinder 21, a second cylinder 23, and an atomizing core 24. The gasket 12 is attached to the upper holder 11; the third seal ring 13 and the upper seal ring 14 are respectively embedded in an inner ring and an outer groove of the upper holder 11; the second cylinder 23 is sheathed on the connecting thread 19; the spring 20 is disposed in the second cylinder 23; the fifth seal ring 22 is disposed in the first cylinder 21; the first cylinder 21 and the atomizing core 24 are embedded in the lower holder 18. The connecting thread 19, the spring 20, the first cylinder 21, the fifth seal ring 22 and the second cylinder 23 constitute an elastic e-liquid sealer. When the atomizing core 24 is mounted on the lower holder 18 and is pressed downward, the first cylinder 21 also moves downwards, the spring 20 deforms, and the e-liquid inlet of the lower holder 18 is opened, the e-liquid enters the atomizing core 24. When the atomizing core 24 is pulled out, the spring 20 resets, the first cylinder 21 returns to the original position, the e-liquid inlet is closed and separated from the atomizing core 24, thus avoiding the leakage of the e-liquid in the process of replacing the atomizing core. The lower seal ring 16 is embedded in a groove of the lower holder 18; the fourth seal ring 17 is sheathed on the lower seal ring 16; the glass tube 15 is fixed on the lower holder 18; the lower holder 18 is in threaded connection to the upper holder 11; the limit spring 10 is sheathed on the positioning pin 9, and the positioning pin 9 is fixed on the upper holder 11. The mouthpiece assembly is disposed on the atomization assembly. The sliding block 8 is embedded in the upper holder 11 via the positioning pin. In use, the movable cover 3 is pulled up and pushed to one side, and the sliding block 8 shifts to a fixed direction, so that the e-liquid inlet on the gasket 12 under the movable cover 3 is exposed for e-liquid charging.

The base assembly C comprises an airflow regulating ring 27, a fixing ring 25 adapted to fix the airflow regulating ring, a sixth seal ring 26 adapted to seal the fixing ring 25, a joint 28, an insulating ring 29, a base 31, and a seventh seal ring 30 adapted to seal the base. The joint 28 is disposed in the insulating ring 29; the insulating ring 29 is disposed in the base 31; the sixth seal ring 26 is sheathed on the fixing ring 25, and the fixing ring 25 is sheathed on the base 31; the seventh seal ring 30 is sheathed on the base 31; and the airflow regulating ring 27 is in threaded connection to the base. The base 31 is in threaded connection to the lower holder 18 of the atomization assembly.

It will be obvious to those skilled in the art that changes and modifications may be made, and therefore, the aim in the appended claims is to cover all such changes and modifications.

What is claimed is:

1. An electronic cigarette, comprising:
a mouthpiece assembly, the mouthpiece assembly comprising a mouthpiece, a decorative cover, a movable cover, a fixed base adapted to fix the mouthpiece, a seal ring adapted to seal the fixed base, a first seal ring and a second seal ring adapted to seal the mouthpiece, and a sliding block;
an atomization assembly, the atomization assembly comprising a positioning pin, a limit spring, an upper holder, a gasket, a third seal ring adapted to seal the upper holder, a glass tube, an upper seal ring adapted to seal the glass tube, a lower seal ring adapted to seal the glass tube, a fourth seal ring adapted to seal the lower holder, a lower holder, a connecting thread, a spring, a first cylinder, a fifth seal ring adapted to seal the first cylinder, a second cylinder, and an atomizing core;
a base assembly, the base assembly comprising an airflow regulating ring, a fixing ring adapted to fix the airflow regulating ring, a sixth seal ring adapted to seal the fixing ring, a joint, an insulating ring, a base, and a seventh seal ring adapted to seal the base;
wherein:
the seal ring is sheathed on the fixed base and the fixed base is disposed in the movable cover; the decorative cover is disposed in the movable cover and fixed on the fixed base; the first seal ring and the second seal ring are sheathed on the mouthpiece; the mouthpiece is in threaded connection to the decorative cover; the sliding block is embedded in the fixed base and fixed in the movable cover;
the gasket is attached to the upper holder; the third seal ring and the upper seal ring are respectively embedded in an inner ring and an outer groove of the upper holder; the second cylinder is sheathed on the connecting thread; the spring is disposed in the second cylinder; the fifth seal ring is disposed in the first cylinder; the first cylinder and the atomizing core are embedded in the lower holder; the lower seal ring is embedded in a groove of the lower holder; the fourth seal ring is sheathed on the lower seal ring; the glass tube is fixed on the lower holder; the lower holder is in threaded connection to the upper holder; the limit spring is sheathed on the positioning pin, and the positioning pin is fixed on the upper holder; and
the joint is disposed in the insulating ring; the insulating ring is disposed in the base; the sixth seal ring is sheathed on the fixing ring, and the fixing ring is sheathed on the base; the seventh seal ring is sheathed on the base; and the airflow regulating ring is in threaded connection to the base.

* * * * *